June 23, 1953 — H. J. WOOD — 2,642,749
VARIABLE RATIO FRICTION DRIVE
Filed Aug. 19, 1947
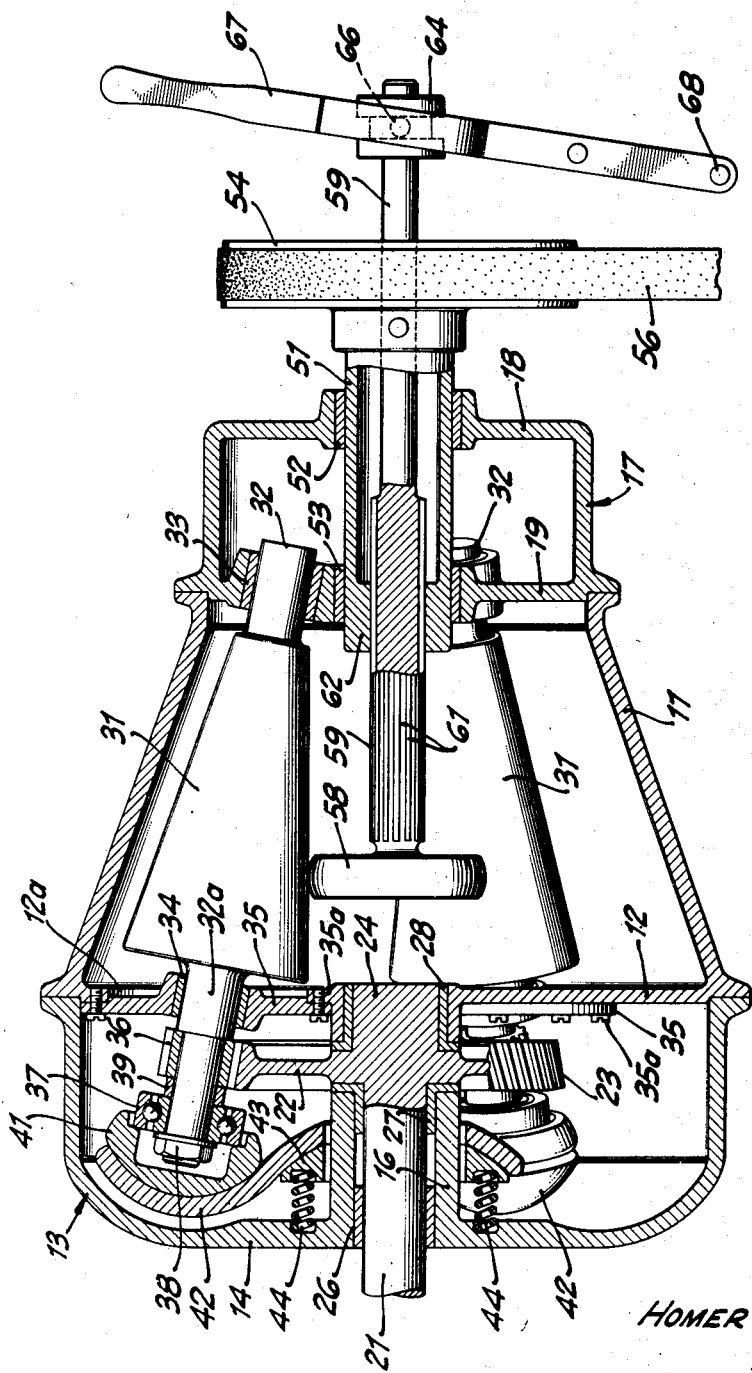
HOMER J. WOOD,
INVENTOR
BY John H.J. Wallace Patented June 23, 1953

2,642,749

UNITED STATES PATENT OFFICE 2,642,749

VARIABLE RATIO FRICTION DRIVE

Homer J. Wood, Sherman Oaks, Calif., assignor to The Garrett Corporation, Los Angeles, Calif., a corporation of California Application August 19, 1947, Serial No. 769,499

7 Claims. (Cl. 74—191)

The present invention relates to variable ratio friction drives in general and particularly to a friction drive in which equal torque is transmitted by each of a plurality of driving members. More specifically the invention comprises a variable ratio friction drive incorporating a plurality of frusto-conical torque-transmitting members which are automatically adjusted to maintain equal torque transmission.

Variable ratio friction drives are preferred means of obtaining an infinitely variable speed output from a constant speed input and vice versa. In such units frusto-conical drums are usually mounted in cooperative relationship to a constant diameter rotatable element, and variations in speed are obtained by shifting the latter so as to bring it into contact with surfaces along the frusto-conical members having greater or lesser diameter. The power which can be transmitted through a single friction contact is limited, and accordingly, it has been found desirable to increase the number of conical members. This increase provides difficulties, however, in that the power transmitted by the various members becomes unbalanced, one or more tending to assume the entire load. The problem has been particularly difficult when three or more conical members have been incorporated.

With an appreciation of the desirability of providing a compact, infinitely variable friction drive, and of overcoming the difficulties which have characterized the constructions of the prior art, it is an object of the present invention to provide a variable ratio friction drive in which the torques transmitted through the various friction contacts are equal.

It is another object of the invention to provide such a drive in which the points of contact of the friction surfaces are automatically shifted in a manner to provide equal torque transmission.

A further object of the invention is to provide a variable speed friction drive incorporating a plurality of frusto-conical power-transmitting members so mounted and driven that a relative increase in the torque transmitted by one affects its displacement to effect a reduction in that torque.

A still further object of the invention is to provide a variable ratio friction drive in which a plurality of conical members are resiliently urged into contact with a single, power-transmitting element, each individual conical member being so mounted and driven that a relative increase or decrease in the torque transmitted by or through it with respect to the other conical members is effective to produce an axial shifting of its position and a resulting compensating change in its torque in order to equalize the respective torques of the plurality of conical members.

These and other more specific objects will appear upon reading the following specification and claims and upon considering in connection therewith the attached drawing to which they relate.

Referring now to the drawing, the single figure comprises a longitudinal section through a variable ratio friction drive constructed in accordance with a preferred embodiment of the invention.

The unit is seen to comprise an enclosing casing formed of a central frusto-conical portion 11 having an end wall 12 provided with assembly ports 12a; an end bell 13 including an end wall 14 formed with an inwardly extending sleeve 16; and an end cap 17 including an outer end wall 18 and an inner end wall 19. Parts 11, 13, 17 are fixedly secured together in any suitable manner and may be sealed along their lines of contact if desired.

A drive shaft 21 carries an integral gear 22 having teeth 23, its inner end being enlarged at 24. Three sleeve bearings 26, 27, and 28 rotatably support the shaft in sleeve 16 and in the end wall 12 of central casing 11. Bushings 27 and 28 are each provided with integral flanges which abut the side walls of gear 22 and serve as thrust bearings for the shaft 21, securing it against axial misalignment. The gear 22 is of the special bevel type known to machine designers as a "face" gear, its teeth 23 having the property peculiar to this type of bevel gear of permitting a spur-toothed pinion in engagement therewith to be shifted axially without affecting the meshing of the teeth. The teeth 23 of gear 22 are helicoidal in direction for a reason which will presently be apparent.

A plurality of frusto-conical drums or cones 31, preferably three in number, are positioned within casing member 11 with their supporting axles comprising the oppositely extending stub shafts 32 and 32a, rotatably mounted in sleeve bearings 33 and 34 supported in the walls 19 and 12, respectively. Bearings 34 are mounted in plates 35 secured in ports 12a by means of cap screws 35a. The axes of drums 31 lie upon an imaginary cone the axis of which is co-axial with shaft 21, and the drums are so sized and shaped that the innermost element of each is contiguous with the surface of an imaginary cylinder concentric to shaft 21.

Each cone shaft 32a has affixed on it intermediate its ends a helical spur-toothed pinion 36 in mesh with the helicoidal teeth of "face" gear 22, while adjacent its threaded outer end the inner race of the ball bearing 37 is mounted, being held in place by a nut 38 and a spacer ring 39. The outer race of each bearing 37 seats in a recess in the cupped interior of a bearing carrier 41 which exteriorly is generally semi-spherical in shape. The carriers 41 have their spherically convex surfaces seated in spherically concave seats formed in a pressure plate 42, the central portion of which encloses in spaced relationship the sleeve 16, at which region it is contacted by an arcuately faced ring 43 urged axially inwardly by a plurality of coil springs 44. The thrust of springs 44 is directly transmitted through plate 42 to the bearing carriers 41 and through the latter to the bearings 37, shafts 32a and cones 31. Limited displacement of the shafts 32 and 32a in the bearings 33 and 34, respectively, is permitted, movement in the converging direction obviously decreasing the spacing between the members 31, while movement in the diverging direction increases the spacing. It is also clear that with respect to an axially fixed point upon the imaginary cylinder with which the drums 31 make line contact the axial shifting of a member 31 will change the diameter of the drum at the point of contact.

The output shaft of the unit is indicated at 51 and is rotatably mounted in axial alignment with shaft 21 in bearings 52 and 53 carried by end walls 18 and 19, respectively, of end cap 17. Shaft 51 comprises a hollow cylinder and carries a power transmission member outside the casing, such as a pulley 54 connected to a power-transmitting belt 56.

To transmit power between the frusto-conical members or drums 31 and the shaft 51 there is provided a generally cylindrical discoidal roller 58 adapted to make rolling contact with each of those members. The surface of roller 58 is very slightly crowned, for a reason which will be presently apparent. It is desirable that roller 58 be axially shiftable to contact members 31 at various positions along their lengths in order to vary the ratio of rotational speeds, and this is made possible by mounting the roller upon a shaft 59 extended axially through hollow shaft 51 and slidably connected thereto by splines 61 upon its exterior, which extend slidingly within the correspondingly splined end 62 of the enclosing shaft. Shaft 59 is extended through the hollow shaft 51 past the pulley 54 and has affixed to its outer end a grooved collar 64. A lever 67 fixedly pivoted at 68, may be actuated in any suitable manner, as for example manually, and carries a pin 66 extended into the groove of collar 64, so that pivotal movement of the lever effects the axial displacement of the shaft 59 and with it roller 58. Because of the differences in diameter between the ends of the members 31 it is clear that, depending upon the axial position which roller 58 has with respect to the members, the drive ratio of the transmission will be greater or lesser.

Referring again to the helical pinions 36 in mesh with the gear 22, the end thrust on each pinion is directly proportional to the torque which it transmits. The teeth of the pinion are so angled that the driving thrust thereon in the case of each pinion has an axial component tending to shift the connected conical member 31 toward the left as viewed in the drawing, that is, it tends to move the member from contact with roller 58 and to bring that portion of its surface having a smaller diameter into contact therewith. This force is in opposition to the spring force exerted through the plate 42. In a preferred relationship, at a maximum this thrust exerted through a pinion 36 will not exceed say, about 25 percent of the spring force exerted on plate 42.

In the operation of the friction drive constructed in accordance with the present invention in the embodiment shown, power is applied to the input shaft 21 resulting in the rotation of the gear 22. Pinions 36 in mesh with gear 22 are rotated thereby, the transmitted torque resulting in each case in an end thrust tending to shift the connected frusto-conical member 31 within its supporting bearings 33 and 34. The rotation of members 31 effects the rotation of roller 58 in frictional rolling contact therewith, the members being forced thereagainst under the action of the springs 44. Depending upon the axial positioning of roller 58 by its shaft 59, the output shaft 51 connected thereto rotates at a greater or lesser speed. As described, this speed can be controlled by shifting shaft 59 axially by means of lever 67.

If one of the members 31 should begin to assume more than its share of the power transmitted, there is an instantaneous corresponding increase in the torque transmitted by its helical pinion 36. The concomitant increase in end thrust thereon results in a shifting of the attached conical element 31 toward the left, as viewed in the drawing, whereupon the force maintaining its frictional contact with the roller 58 will be decreased, as will the diameter of its surface in contact therewith. A decrease in load on the part of the conical element immediately results in equalization in the load distribution. The force-transmitting plate 42 is loaded centrally by the springs 44 and an increase in the opposing force exerted through one of the bearing carriers 41 effects a slight tilting of the plate to permit the described displacement of the overloaded frusto-conical member. The several springs 44 can, if preferred, be replaced by a single spring or by other suitable force-exerting means.

When one of the conical members 31 shifts to the left slightly in its compensating action, its distance from the axis of the previously mentioned imaginary cylinder increases. In order that roller 58 may remain in contact with whichever of the members 31 that happens to be shifting, the fit between the external and internal splines 61 and 62 is made loose enough or of such configuration that shaft 59 is able to tilt to a small extent. As previously mentioned, roller 58 is crowned slightly in order to permit this small angularity of its axis and yet allow good contact with the cones. It should be noted that roller 58 will be maintained in contact with the shifting conical member during any compensating action thereof by the crowding action of the other conical members, thus the roller may be said to "float" between the cones, maintaining good contact with all of them.

While the operation of the unit has been explained in terms of using shaft 21 as the input shaft and the shaft 51 as the output shaft yet it is to be understood that this relationship can be reversed if desired, power being applied to shaft 51 and being taken from shaft 21. No change in the described construction would be necessary by this reversal with the exception that the angle of the teeth of pinions 36 would be altered so that an increase in torque transmitted by a pinion would continue to effect an increase in the end thrust of the connected shaft in opposition to the force exerted by springs 44.

While I have shown, for purposes of illustration, a preferred embodiment in which the cones engage a roller element centered between them, it will be apparent to those skilled in the art that the invention contemplates and has application to other embodiments. Its principles may, for example, be applied to torque equalization of known friction drives in which a plurality of frusto-conical rollers are disposed in torque-transmitting frictional contact with an annular driven or driving roller member encompassing them, instead of with a discoidal roller member. It will be understood, therefore, that it is my intention to cover the invention broadly, within the spirit and scope of the appended claims.

I claim:

1. In a variable speed power transmission, the combination of a power input shaft, a power output shaft, and power transmitting means therebetween including a plurality of axially shiftable frusto-conical members, driving connnections between one of said shafts and said members including means to provide an axial thrust upon each member proportional to the torque transmitted, means to exert an axial thrust on each of said members in opposition to the thrust provided by said driving connections, and a roller member in contact with said frusto-conical members and carried by the other of said shafts.

2. In a variable speed power transmission, the combination of a power input shaft, a plurality of frusto-conical torque transmitting members, means mounting said members for rotation and for individual axial displacement, driving connections between said shaft and said members including means to exert an axial thrust upon each member proportional to the torque transmitted, yieldable means exerting an axial force upon each of said members and in a direction opposite to that provided by said driving connection, a driven shaft, and a roller member carried by said driven shaft in contact with said driving members.

3. In a variable speed transmission, the combination of a power input shaft, a power output shaft, and power transmitting means therebetween comprising a plurality of frusto-conical members, means mounting said members for rotation and for axial displacement, gear connections between one of said shafts and said members, the teeth of said gears being so contoured and disposed as to provide an axial thrust upon each member proportional to the torque transmitted, yieldable means to exert an axial thrust on each of said members in opposition to the thrust provided by said gear connections and adapted to permit an axial shifting of a member under a sufficient opposing force, and roller means connected to the other of said shafts in torque transmitting contact with said frusto-conical members.

4. In a variable speed transmission, the combination of a power input shaft, a power output shaft, and power transmitting means therebetween comprising a plurality of frusto-conical members, means mounting said members for rotation about an axial displacement along axes on an imaginary cone having as its own axis the axis of one of said shafts, gear connections between each of said members and one of said shafts, the teeth of said gears being so contoured and disposed as to provide an axial thrust on the connected member proportional to the torque transmitted and in the direction away from the apex of said imaginary cone, resilient means to exert an axial thrust on each of said members in opposition to the thrust provided by said gear connections and adapted to permit an axial shifting of a member under a sufficient force, and axially shiftable roller means connected to the other of said shafts and disposed in contact with said frusto-conical members.

5. In a variable speed transmission, the combination of a power input shaft, a power output shaft, and power transmitting means therebetween comprising a plurality of frusto-conical members, means mounting said members for rotation and for axial displacement, gear connections between one of said shafts and said members, the teeth of said gears being so contoured and disposed as to provide an axial thrust upon each member proportional to the torque transmitted, means to exert a yieldable axial thrust on each of said members in opposition to the thrust of said gear connections whereby an increase in the torque transmitted effects the axial shifting of the connected member, and axially shiftable roller means connected to the other of said shafts, and disposed in contact with said frusto-conical members.

6. The construction recited in claim 5 characterized in that said means to exert a yielding thrust on each of said frusto-conical members in opposition to the thrust provided by said gear connection comprises a pressure plate, spring means urging said plate to exert a force on said member, and means including bearings connecting said plate to said member.

7. In a variable speed power transmission, the combination of a power input shaft, a plurality of frusto-conical torque transmitting members, means mounting said members for rotation and for individual axial displacement, driving connections between said shaft and said members including means to exert an axial thrust upon each member proportional to the torque transmitted, yieldable means exerting an axial force upon each of said members and in a direction opposite to that provided by said driving connection, a driven shaft, and a self-centering roller member carried by said driven shaft in contact with said torque transmitting members.

HOMER J. WOOD.

References Cited in the file of this patent

UNITED STATES PATENTS

| Number | Name | Date |
|---|---|---|
| 1,246,683 | Tooth | Nov. 13, 1917 |
| 1,762,199 | Standish | June 10, 1930 |
| 2,126,508 | Schmitter | Jan. 18, 1937 |
| 2,240,148 | Schmitter | Apr. 29, 1941 |